United States Patent [19]

Cardimona

[11] Patent Number: 4,858,238
[45] Date of Patent: Aug. 15, 1989

[54] STIMULATED RAMAN SCATTERING ENHANCER

[75] Inventor: David A. Cardimona, Albuquerque, N. Mex.

[73] Assignee: The United States of America as represented by the Secretary of the Air Force, Washington, D.C.

[21] Appl. No.: 144,310

[22] Filed: Jan. 14, 1988

[51] Int. Cl.⁴ .............................................. H01S 3/094
[52] U.S. Cl. ........................................ 372/3; 372/18; 372/53; 372/73
[58] Field of Search ................... 372/3, 18, 20, 53, 93, 372/97, 69-71, 73

[56] References Cited

U.S. PATENT DOCUMENTS

| | | | |
|---|---|---|---|
| 3,417,346 | 12/1968 | Yatsiv | 331/94.5 |
| 4,048,516 | 9/1977 | Ammann | 307/88.3 |
| 4,264,877 | 4/1981 | Grischkowsky et al. | 331/94.5 G |
| 4,315,224 | 2/1982 | Ezekiel et al. | 331/3 |
| 4,318,057 | 3/1982 | Buchwald et al. | 372/70 |
| 4,399,539 | 8/1983 | White | 372/70 |
| 4,486,884 | 12/1984 | White | 372/69 |

FOREIGN PATENT DOCUMENTS 2034962 6/1980 United Kingdom .................... 372/3

OTHER PUBLICATIONS

Cardimona, D. A., "Enhancement of off-resonant stimulated Raman scattering," J. Phys. B: At. Mol. Phys. 20 (1987), 199-209, printed in the UK.

Primary Examiner—William L. Sikes
Assistant Examiner—Xuân Thi Vo
Attorney, Agent, or Firm—William G. Auton; Donald J. Singer

[57] ABSTRACT

Normal stimulated Raman scattering (SRS) is done in a gas cell with pump and Stokes seed input beams. The pump photons excite gas molecules in the gas cell from their ground state and the Stokes seed photons stimulate the de-excitation of the molecules back to a lower state (emitting more Stokes photons in the process). The SRS enhancer entails inputting another beam at a frequency, different from the pump and seed, tuned between a third molecular state and the Raman virtual state created by the pump/seed off-resonant two-photon transition. The third laser enhances the Raman virtual state, thereby also enhancing the two-photon transition rate. Since the two-photon transition is the SRS process, the Stokes amplification is enhanced.

2 Claims, 1 Drawing Sheet

STIMULATED RAMAN SCATTERING ENHANCER

STATEMENT OF GOVERNMENT INTEREST

The invention described herein may be manufactured and used by or for the Government for governmental purposes without the payment of any royalty thereon.

BACKGROUND OF THE INVENTION

The present invention relates generally to stimulated Raman scattering (SRS) lasers, and more specifically to an SRS laser which uses a third enhancing beam to enhance the pump energy-to-Stokes energy conversion.

Laser action was first established in a optical cavity which allowed photons to be reflected back and forth so as to build up the intensity of the radiation. A technique for producing intense tunable coherent radiation is stimulated Raman scattering. In employing SRS, an intense laser beam is converted into a beam of another frequency by coherent stimulation of a Raman scattering processes. The SRS laser phenomena works as described below.

Light scattering by various substances involves the scattering of a light beam which traverses a transparent dielectric sample (solid, liquid or gas), the scattering being caused by the different dielectric characteristics of the sample. This linear or thermal scattering of light has been observed without lasers for a long time. With the advent of the laser and its high intensity, collimation, and monochromaticity, research in light scattering spectroscopy has been greatly facilitated.

SRS concerns scattering from the optic vibrational modes and is achieved by directing a pump beam from a laser, usually pulsed, through a Raman medium. The pump beam decomposes into a Stokes wavelength output, which is photon-like, and a Raman wavelength output.

Normal stimulated Raman scattering is done in a gas cell with pump and Stokes seed input beams. The pump photons excite the gas molecules from their ground state and the Stokes seed photons stimulate the de-excitation of the molecules back to a lower state (emitting more Stokes photons in the process). The task of enhancing the Stokes output is alleviated to some extent, by the systems disclosed in the following U.S. Patents, the disclosures of which are incorporated by reference.

U.S. Pat. No. 3,417,346 issued to Yatsiv;
U.S. Pat. No. 4,048,516 issued to Ammann;
U.S. Pat. No. 4,264,877 issued to Grischkowsky et al;
U.S. Pat. No. 4,315,224 issued to Ezekiel et al; and
U.S. Pat. No. 4,318,057 issued to Buchwald et al.

The references cited above describe prior art stimulated Raman scattering laser systems. Grischkowsky et al disclose a laser which uses various plural pumping arrangements and discusses both a two photon process and a three-photon process. Stimulated Raman scattering is also disclosed in the Ammann patent.

Yatsiv is concerned with a laser having Raman material for double quantum absorption and Buchwald et al speak of a Raman laser which uses two optical pumping mechanisms. Ezekiel et al use three pumping lasers on a molecular beam, with the second and third pumps at a point further down the beam from the first optical pumping source. Also, in the Ezekiel et al construction two of the optical pumping beams are at the same frequency.

In view of the foregoing discussion, it is apparent that stimulated Raman scattering systems represent an emerging technology in which there remains a need to enhance the Stokes radiation output. The present invention is intended to satisfy that need.

SUMMARY OF THE INVENTION

The present invention includes a stimulated Raman scattering enhancer which improves the Stokes photon output of SRS laser systems. One embodiment of the laser system of the present invention includes: a laser pump beam source, a Stokes seed beam source, beam combiner optical elements, a gas Raman cell, and an enhancing beam source. This enhanced SRS laser system operates in the manner described below.

The laser pump beam source produces pump photons which excite the gas molecules of the Raman cell to a discrete energy level above their ground state. The Stokes seed beam source produces a Stokes seed beam at a wavelength that stimulates the de-excitation of the molecules in the Raman cell back to the lower energy level state. The enhancing beam source produces an enhancing beam which has a frequency that is different from the pump beam and the seed beam. This enhancer beam is tuned between a third molecular state and the Raman virtual state created by the pump/seed off-resonant two-photon transition. The third laser enhances the Raman virtual state, thereby also enhancing the two-photon transition rate and thereby enhancing the Stokes amplification. The beam combiner optics are used to simply combine the pump beam, Stokes beam and the enhancer beam so that they can be input into the Raman cell.

In one embodiment of the invention, the particular Raman cell used is a molecular oxygen gas Raman cell. However, note that this is just intended to be an example of the principles of the present invention and not words of limitation. The SRS enhancer is applicable to other known Raman cells when the principles of the present invention are applied.

When the oxygen gas Raman cell is used, a suitable pump beam source is an argon ion laser which produces a pump beam with a wavelength of 514 nm. The pump beam frequency is selected such that the wavelength excites hhe molecules of the particular Raman scatterer from the ground state to the excited state when the changes in energy level $\Delta E$ is calculated by $h\omega = \Delta E$; where $\omega$ is $2\pi f$; f is the frequency of the beam, and h is Planck's constant divided by $2\pi$.

The enhancing beam source, in the system described above, is an argon-pumped Rhodamine dye laser, which produces the enhancing beam with a 673 or 643 nm wavelength.

The suitable Stokes beam source, for the system described above, is an argon-pumped DCM dye laser which produces a Stokes beam with a 559 nm wavelength. The enhancement effect of the stimulated Raman scattering enhancer is, in the above example, on the order of $2I_L$ percent, where $I_L$ is the strength of the enhancing beam in $MW/cm^2$.

It is an object of the present invention to improve the Stokes photon output of stimulated Raman scattering laser systems.

It is another object of the present invention to provide a stimulated Raman scattering enhancer system that enhances the Raman virtual state of SRS laser systems to increase the Stokes amplification.

These objects together with other objects, features and advantages of the invention will become more readily apparent from the following detailed description when taken in conjunction with the accompanying drawing wherein like elements are given like reference numerals throughout.

DETAILED DESCRIPTION OF THE PREFERRED EMBODIMENT

The present invention includes a stimulated Raman scattering laser which uses a third enhancing beam to enhance the pump energy-to-Stokes energy conversion. It increases the efficiency of the Raman cells, allowing more power output with a shorter cell length. The SRS enhancer entails inputting a third laser beam at a frequency different from the normal pump and seed beams. The pump photons excite the gas molecules from their ground state and the Stokes seed photons stimulate the de-excitation of the molecules back to a lower state (emitting more Stokes photons in the process). The third laser enhances the Raman virtual state created by the pump/seed off-resonant two-photon transition. Since the two-photon transition is the SRS process, the Stokes amplification is enhanced.

Figure 1:
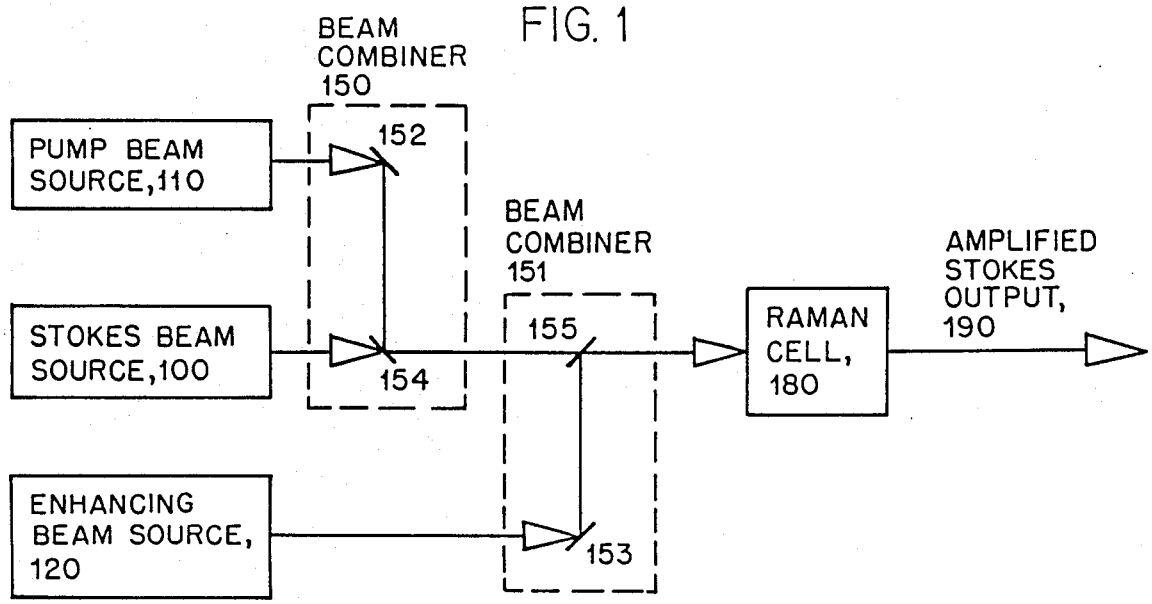
FIG. 1 is a block diagram of an embodiment of the present invention.

The reader's attention is now directed towards FIG. 1, which is a block diagram of an embodiment of the present invention which includes: a Stokes seed beam source 100, a pump beam source 110, an enhancing beam source 120, two beam combiners 150, 151, and a Raman cell 180. The operating principle of the present invention is as follows. Normal stimulated Raman scattering (SRS) is done in a gas cell with pump and Stokes seed input beams. The pump photons excite the gas molecules from their ground state and the Stokes seed photons stimulate the de-excitation of the molecules back to a lower state (emitting more Stokes photons in the process). The system of FIG. 1 includes an enhancing beam source 120, which inputs another beam at a frequency, different from the pump and seed, tuned between a third molecular state and the Raman virtual state created by the pump/seed off-resonant two-photon transition. This enhancing beam enhances the Raman virtual state, thereby also enhancing the two-photon transition rate. Therefore the use of the enhancing beam has the effect of enhancing the pump energy-to-Stokes energy conversion, and increases the amplified Stokes output 180 from the Raman cell 180.

The theory of the operating principle of the present invention was described in an article appearing in the Jan. 14, 1987 issue of the *Journal of Applied Physics B*, vol. 20, p. 199 by Mr. Cardimona entitled "Enhancement of off-resonant stimulated Raman scattering," the disclosure of which is specifically incorporated by reference. This description is recapitulated briefly below, and indicates that bound atomic or molecular states can be dressed by an applied field in a fashion analogous to the pseudoauto-ionizing structure induced in a photo-ionizing continuum. Just as the continuum structure can enhance the photo-ionization rate, the induced virtual structure between real states can be used to enhance multiphoton processes by tuning one of the intermediate fields near this virtual resonance.

Returning to the system of FIG. 1, an example of the appropriate enhancer beam source for an oxygen Raman cell is as follows.

When the oxygen gas Raman cell 180 is used, a suitable pump beam source 110 is an argon ion laser which produces a pump beam with a wavelength of 514 nm. The pump beam frequency is selected such that the wavelength excites the molecules of the particular Raman scatterer from the ground state to the excited state when the change in energy level $\Delta E$ is calculated by $h\omega = \Delta E$; where $\omega$ is $2\pi f$; f is the frequency of the beam, and h is Planck's constant divided by $2\pi$.

The Stokes seed beam source 100, in the system described above, is an argon-pumped DCM dye laser which produces a Stokes beam with a 559 nm wavelength. The suitable enhancing beam source 120 for the system described above, is an argon-pumped Rhodamine dye laser, which produces the enhancing beam with a 673 or 643 wavelength. The enhancement effect of the stimulated Raman scattering enhancer is, in the above example, on the order of $2I_L$ percent when $I_L$ is the strength of the enhancing beam in MW/cm$^2$.

The beam combiners 150 and 151 each contain a 100 percent reflective mirror 152, 153 and a mirror that is partially reflective and partially transmissive 154, 155. The second mirror 154 of the first beam combines 150 receives and combines the pump beam and the Stokes beam. Therefore, it should be reflective at 514 nm, and transmissive at 673 nm. The second mirror 155 of the second beam combiner 151 should be reflective at 559 nm, and transmissive at 514 nm and 673 nm.

Figure 2:
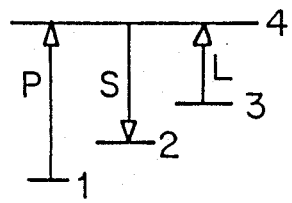
FIGS. 2 and 3 are charts depicting various energy levels of a Raman scattering material.
Figure 3:
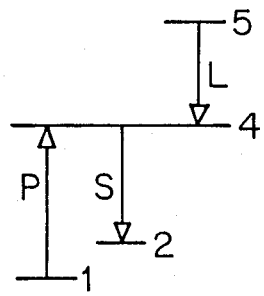

The reader's attention is now directed towards FIGS. 2 and 3, which are molecular energy level diagrams defining the characteristics of the pump beam, the Stokes beam, and the enhancement beam for the system of FIG. 1. More specifically, the pump beam, Stokes beam and enhancement beam are characterized respectively by wavelengths of $\omega_P$, $\omega_S$, $\omega_L$. As mentioned above, the pump beam wavelength is selected so that it excites the molecules of the particular Raman scatterer from the ground state to an excited state 5 where the change in energy level $\Delta E_p = h\omega_p$; where h is Planck's constant divided by $2\pi$. Similarly, the Stokes seed beam and enhancement beam wavelengths are respectively defined by the changes in energy levels shown in FIGS. 2 and 3 such that $\Delta E_S = h\omega_S$ and $\Delta E_L = h\omega_L$.

In FIGS. 2 and 3 the energy levels are denoted by 1-5 where: 1 is the ground vibrational state of $O_2$; 2 is the first vibrational state of $O_2$ above the ground state; 3 is the third vibrational state of $O_2$; 4 is the lowest vibrational state of the excited electronic state of $O_2$; and 5 is the vibrational state above 4. As depicted in FIGS. 2 and 3, the enhancer beam is characterized as having a wavelength $\omega_L$ which is proportional to $h\Delta E_L$ where $\Delta E_L$ is a measure of the change in energy level between the selected excited state 4 and either: the third vibrational state 3 which is above the excited electronic state 4. Once the change in the energy level $\Delta E_L$ is known, the wavelength of the enhancer beam $W_L$ is given by $\Delta E_L = h\omega_L$, as described above.

Referring back to the system of FIG. 1, the particular Raman cell used is a molecular oxygen gas Raman cell 180. With this Raman cell, the suitable pump beam source, Stokes seed beam source, and enhancing beam source are the lasers identified above. However, this system is meant to serve as just one example of the present invention. The Raman scattering enhancer of the present invention can improve the performance of any stimulated Raman scattering laser system which uses other known Raman cells. Additionally, other configurations of optical elements are possible, as illustrated in FIG. 4.

Figure 4:
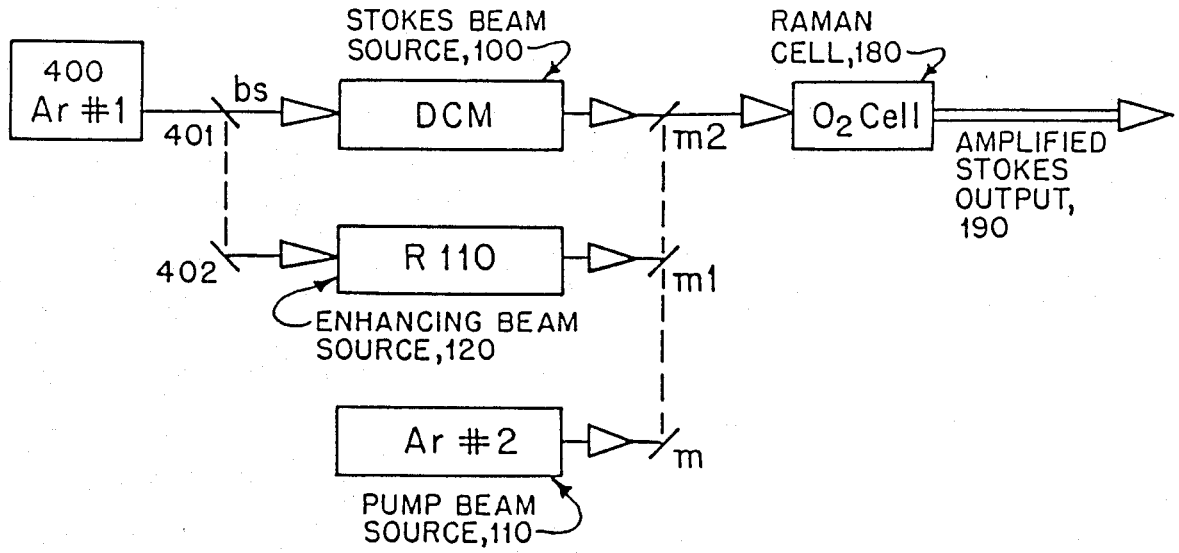
FIG. 4 is a block diagram of another embodiment of the present invention.

FIG. 4 is a block diagram of another embodiment of the present invention which uses: a Stokes beam source 100, a pump source 110, and an enhancing beam source 120 whose beams are combined and directed to an oxygen gas Raman cell 180 by mirror m, m1 and m2.

Both the Stokes beam source 100 and the enhancing beam source 120 are energized by an argon ion laser 400, whose output is split by a beam splitter 401 and a mirror 402. As with the system of FIG. 1, the pump beam source 110 is an argon ion laser tuned to 514 nm, and the Stokes beam source 100 is a Rhodamine dye laser tuned to 559 nm. The enhancing beam source 120 is a DCM dye laser which is tuned to 673 nm when following the enhancing strategy of FIG. 2, and tuned to 643 nm when following the enhancing strategy of FIG. 2. As discussed above, the enhancing beam frequency is associated with the particular change in energy level E by the relationship $\Delta E = \hbar \omega$, where h is Planck's constant divided by $2\pi$, W equals $2\pi f$, f is the frequency of the laser beam, and $\Delta E$ is the change in energy level in election volts. For a more detailed discussion of the wave equations, see the above-cited article.

While the invention has been described in its presently preferred embodiment it is understood that the words of limitation and that changes within the purview of the appended claims may be made without departing from the scope and spirit of the invention in its broader aspects.

What is claimed is:

1. An enhanced stimulated Raman scattering laser system which comprises:

a Raman cell which contains Raman scatterer material which may be excited from a ground energy level state to an excited energy level state by receipt of a pump beam, said Raman cell outputting a Stokes photon output beam when undergoing a de-excitation down from said excited energy level state, wherein said Raman cell comprises a gas molecular oxygen Raman cell;

a pump beam laser which outputs said pump beam which has a pump beam frequency which is selected to energize said Raman scatterer material from said ground energy level state to said exited energy level state, wherein said pump beam laser comprises an argon ion laser tuned to a first wavelength of 514 nm;

a Stokes beam laser which outputs Stokes seed photons which have a Stokes beam frequency to stimulate the de-excitation of said Raman cell down from said excited energy level state, wherein said Stokes beam laser comprises a dye laser tuned to a second wavelength of about 559 nm;

an enhancement beam source which emits an enhancement beam which has an enhancement beam frequency which enhances the Raman cell's Raman virtual state and increases thereby said Stokes photon output beam from said Raman cell, wherein said enhancement beam source comprises a dye laser which is tuned to a third wavelength of about 643 nm, and which produces an enhancement laser beam which has an angular frequency which is proportional to said change in energy level of said Raman scatterer material between its excited energy level state, and a vibrational state which is just above said excited energy level state, said angular frequency being given by $$\omega = \frac{\Delta E}{\hbar} \text{ where:}$$

$\omega$ equals said angular frequency, $\Delta E$ equals said change in energy level, in electron volts, of said Raman scatterer material between its excited energy level state, and a vibrational state, which is just above said excited energy level state, and $\hbar$ equals Planck's constant divided by $2\pi$; and a means for combining said enhancement beam from said enhancement beam source with said pump beam from said pump beam laser along with said Stokes seed photons from said Stokes beam laser, said combining means thereby producing a combined beam which is directed towards said Raman cell.

2. An enhanced stimulated Raman scattering laser system which comprises:

a Raman cell which contains Raman scatterer material which may be excited from a ground energy level state to an excited energy level state by receipt of a pump beam, said Raman cell outputting a Stokes photon output beam when undergoing a de-excitation down from said excited energy level state, wherein said Raman cell comprises a gas molecular oxygen Raman cell;

a pump beam laser which outputs said pump beam which has pump beam frequency which is selected to energize said Raman scatterer material from said ground energy level state to said excited energy level state, wherein said pump beam laser comprises an argon ion laser tuned to a first wavelength of 514 nm;

a Stokes beam laser which outputs Stokes seed photons which have a Stokes beam frequency to stimulate the de-excitation of said Raman cell down from said excited energy level state, wherein said Stokes beam laser comprises a dye laser tuned to a second wavelength of about 559 nm;

an enhancement beam source which emits an enhancement beam which has an enhancement beam frequency which enhances the Raman cell's Raman virtual state and increases thereby said Stokes photon output beam from said Raman cell, wherein said enhancement beam source comprises a dye laser tuned to a third wavelength of about 673 nm and which produces an enhancement laser beam which has an angular frequency which is proportional to said change in energy level state, and a vibrational state which is just below said excited energy level state, said angular frequency being given by $$\omega = \frac{\Delta E}{\hbar} \text{ where:}$$

$\omega$ equals said angular frequency;

$\Delta E$ equals said change in energy level, in electron volts, of said Raman scatterer material between its excited energy level state, and a vibrational state, which is just below said excited energy level state; and ℏ equals Planck's constant divided by $2\pi$; and a means for combining said enhancement beam from said enhancement beam source with said pump beam from said pump beam laser with said Stokes seed photons from said Stokes beam laser, said combining means thereby producing a combined beam which is directed towards said Raman cell.

* * * * *